Patented Aug. 10, 1943

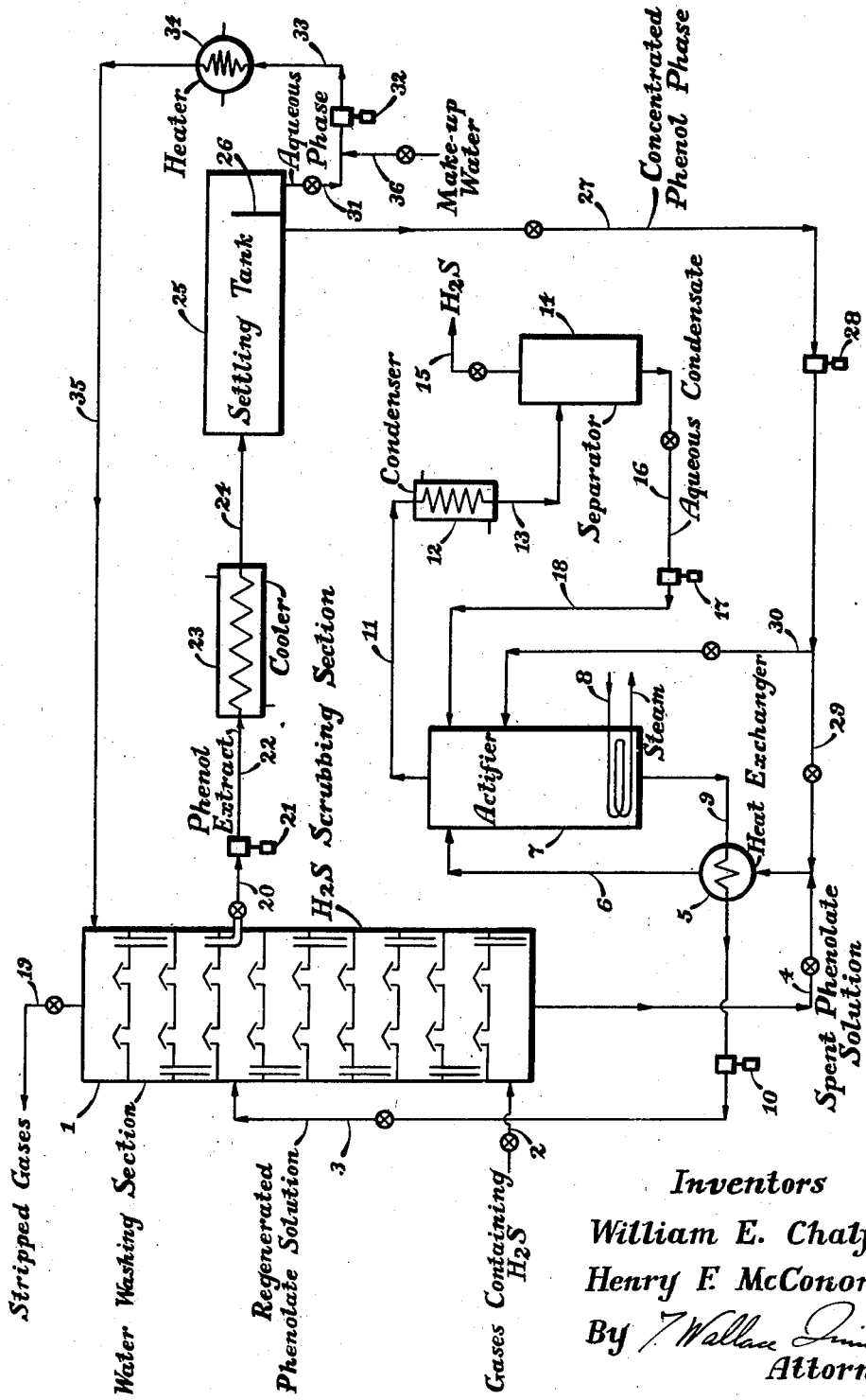

2,326,122

UNITED STATES PATENT OFFICE 2,326,122

RECOVERY OF PHENOL IN GAS PURIFICATION SYSTEMS

William E. Chalfant, Upper Darby, and Henry F. McConomy, Philadelphia, Pa., assignors to The Atlantic Refining Company, Philadelphia, Pa., a corporation of Pennsylvania Application September 22, 1939, Serial No. 296,002

3 Claims. (Cl. 23—3)

The present invention relates to an improved method of recovering phenol from hydrocarbon gases which have been scrubbed with an alkali metal phenolate solution for the removal of acid gases, particularly hydrogen sulfide.

In the scrubbing of hydrocarbon gases with an aqueous solution of sodium phenolate for the removal of hydrogen sulfide from said gases, phenol is liberated from the phenolate solution due to reaction of the sodium phenolate with the hydrogen sulfide, and substantial amounts of the phenol thus liberated may be carried from the system by the scrubbed or purified hydrocarbon gases being withdrawn therefrom.

In accordance with the present invention, provision is made for the recovery of phenol from the scrubbed hydrocarbon gases and the return of the phenol to the phenolate scrubbing solution. The present invention is an improvement over that disclosed and claimed in United States Patent #2,028,124 to Shaw, wherein the phenolate method of acid gas removal is described in detail. In such patent, it is suggested that in the event that substantial amounts of phenol are carried out of the solution by the gases in the absorption stage, such phenol may be recovered from the gases by washing with water, oil, or alkaline solution, the solution of phenol or phenolate thereby obtained being returned to the phenolate scrubbing solution. In this operation, all of the water employed in washing the phenol from the gases is returned to the phenolate solution in the absorption tower, along with any phenol which may be in solution in the water. This procedure is undesirable in that the phenolate solution in the absorption tower is continuously and excessively diluted, with consequent decrease in its absorptive capacity for acid gases such as hydrogen sulfide. Such difficulty is overcome by operating in accordance with the method of the present invention.

Briefly, the present invention comprises washing the phenol-containing gases with water, preferably at an elevated temperature, to extract therefrom entrained phenol, cooling the resulting aqueous solution of phenol sufficiently to form two phases, one comprising concentrated phenol and the other comprising water containing a minor quantity of phenol, separating the concentrated phenol phase from the aqueous phase, returning the phenol concentrate to the phenolate scrubbing solution, and returning the aqueous phase to the water-washing operation.

Our invention may be further illustrated with reference to the accompanying drawing, which presents diagrammatically a system suitable for use in accordance with the present invention.

Referring to the drawing, the gas to be purified, for example, hydrocarbon gas containing hydrogen sulfide ($H_2S$), enters the lower part of absorber 1 through valve-controlled line 2, at a superatmospheric pressure within the range of from about 100 to about 300 lbs./sq. in. and preferably at a pressure of about 200 lbs./sq. in. The absorber 1 is shown as comprising a conventional bell-and-tray type tower, although other types of gas and liquid contact apparatus may be employed. The absorber is constructed with a lower section for scrubbing the $H_2S$-containing gas with alkali metal phenolate solution, and an upper section for water-washing the phenol-containing gas passing upwardly from the scrubbing section, provision being made to prevent the aqueous phenol extract from the upper section from passing downwardly into the lower section. The gas introduced through line 2 flows upwardly through the scrubbing section of absorber 1 countercurrent to a descending flow of an absorbent or scrubbing liquid comprising a solution of an alkali metal phenolate introduced into the scrubbing section of absorber 1 through valve-controlled line 3, preferably at a temperature of about 130° F. All or a portion of the $H_2S$ and analogous acidic impurities or constituents contained in the gas are absorbed or reacted with this alkali phenolate solution, the $H_2S$ being converted to sodium sulfide, with the consequent liberation of phenol from the phenolate solution. The liquid reaching the bottom of the absorber 1, and comprising, for example, a mixture or emulsion of an aqueous solution of sodium sulfide or sulfhydrate and possibly also sodium hydroxide, carbonate and phenolate, with an immiscible phase of liberated phenol, is withdrawn therefrom by valve-controlled line 4 and passed through heat exchanger 5 and line 6 into the actifier 7 provided with a heating coil 8. Due to the heating of the solution which takes place in the heat exchanger 5 and in the actifier 7, the solution is eventually brought to a temperature approximating its boiling point, for example, 220° F.–240° F., under a superatmospheric pressure of the order of from about 5 to about 10 lbs./sq. in. This heating causes the liberation from the solution of an amount of acidic gases ($H_2S$) substantially equal to that removed from the hydrocarbon gases in the absorber 1 and the resolution of the phenol carried out of the absorber 1 as an immiscible liquid. The regenerated phenolate solution passes out of the actifier 7 through line 9 to heat exchanger 5, wherein it is cooled to about 130° F., and thence delivered by pump 10 through valve-controlled line 3 to the $H_2S$-scrubbing section of absorber 1, thus completing the cycle.

The vapors and gases withdrawn from the top of actifier 7 and comprising essentially acid gases ($H_2S$), steam and volatilized phenol, are passed through line 11 to condenser 12 wherein the steam and phenol vapors are condensed, and the condensate and acid gases are then delivered to separator 14 by means of line 13. Acid gases ($H_2S$) are withdrawn from the top of separator 14 through valve-controlled line 15 and disposed of as desired, while the aqueous condensate containing phenol is returned to the actifier 7 by means of valve-controlled line 16, pump 17, and line 18.

Referring again to absorber 1, the hydrocarbon gases flowing upwardly from the $H_2S$ scrubbing section have been found to exhibit a tendency to carry out substantial amounts of phenol liberated in the scrubbing section. This being the case, the gases leaving the scrubbing section are caused to flow through a water-washing section comprising the upper portion of absorber 1. The gases containing entrained phenol, in passing upwardly through the washing section, are subjected to countercurrent washing with water or a dilute solution of phenol introduced into the top of the washing section. This washing operation is preferably carried out at an elevated temperature of the order of 100° F. to 150° F., and preferably at about 120° F.–130° F., at which temperature the washing liquid, which may be water, has substantial solvent power for phenol. Pressures employed during the washing operation are generally of the same order as those employed in the $H_2S$ scrubbing or absorption step, i. e., from about 100 to 300 lbs./sq. in., and preferably about 200 lbs./sq. in.

The hydrocarbon gases which have been substantially freed or stripped of entrained phenol are removed from the top of absorber 1 by means of valve-controlled line 19, while the heated solution containing phenol extracted from the gases is withdrawn from the lower-most tray of the washing section by means of valve-controlled line 20. This phenol extract, at a temperature of for example, 130° F., is pumped by pump 21 through line 22 into cooler 23, wherein the extract is cooled to a temperature sufficient to cause the formation of two immiscible phases, one comprising concentrated phenol containing a minor quantity of water, and the other comprising water containing a minor quantity of phenol. The temperature at this stage may be of the order of from about 50° F. to about 90° F. or 100° F. The mixture of the immiscible phases thus produced is passed from cooler 23 by means of line 24 into a settling tank 25 provided adjacent one end with a dam or weir 26. In the settling tank the mixture is permitted to settle and stratify, the concentrated phenol phase forming a lower layer and the aqueous phase forming an upper layer. The concentrated phenol phase is withdrawn from the bottom of tank 25 through valve-controlled line 27 and is delivered by pump 28 through valve-controlled line 29 to the inlet side of heat exchanger 5, wherein it is commingled with spent phenolate solution from absorber 1 passing to actifier 7. Or, alternatively, the phenol concentrate may be delivered by pump 28 through valve-controlled line 30 directly to the actifier 7.

The aqueous phase containing a minor quantity of phenol and comprising the upper layer in settling tank 25 flows over weir 26 and is withdrawn from the tank through valve-controlled line 31. This aqueous phase, which may contain of the order of 6%–10% phenol, is pumped by means of pump 32 through line 33 to heating device 34, wherein it is heated to a temperature of the order of 100° F.–150° F., and preferably 130° F. The heated aqueous phase or solution is then delivered by means of line 35 to the top of the washing section of absorber 1 for reuse in washing entrained phenol from the hydrocarbon gases. When necessary, make-up water may be introduced into the phenol-recovery system by means of valve-controlled line 36 at the intake side of pump 32.

While, in the illustration given above, reference is made to the use of an alkali metal phenolate solution as the absorption agent for acid gases, it is to be understood that phenolic compounds of the alkaline earth metals may also be employed. Preferably, the absorbent liquid is prepared by adding a solution of a phenol or a mixture of phenols, i. e., phenol, cresol, and xylenol (tar acids) to a solution of a compound of an alkali-forming metal such as sodium or potassium hydroxide, in sufficient amount to react with all of the hydroxide to form sodium or potassium phenolates, with or without an excess of phenols in uncombined form.

It will be obvious to those skilled in the art that our invention is not limited to any of the specific details given hereinabove by way of illustration, but is to be construed as of the scope of the claims hereinafter made.

For brevity, in the appended claims, the term "water" is to be understood to comprehend water or dilute aqueous solutions of phenol or tar acids including the cresols and xylenols.

What we claim is:

1. A process for removing $H_2S$ from hydrocarbon gases, which comprises scrubbing the gases with an alkali metal phenolate solution in an absorption zone, removing the phenolate solution from the lower section of said zone, regenerating said solution to drive off the $H_2S$, recycling the regenerated solution to the absorption zone, further washing the hydrocarbon gases with water in the upper section of said absorption zone at an elevated temperature such that the phenol entrained in said gases is rendered sufficiently soluble in the water to extract it from the hydrocarbon gases, removing the resultant aqueous solution of phenol from the upper section of said absorption zone, cooling said aqueous solution to a temperature sufficiently low so that upon introduction thereof into a settling zone two immiscible phases are formed, one comprising concentrated phenol and the other comprising water containing a minor quantity of phenol, separating the concentrated phenol phase from the aqueous phase, returning the concentrated phenol phase to the alkali metal phenolate solution, and returning the aqueous phase to the washing operation aforesaid.

2. A process for removing $H_2S$ from hydrocarbon gases, which comprises scrubbing the gases with an alkali metal phenolate solution in an absorption zone, removing the phenolate solution from the lower section of said zone, regenerating said solution to drive off the $H_2S$, recycling the regenerated solution to the absorption zone, further washing the hydrocarbon gases with water in the upper section of said absorption zone at a temperature between 120° F. and 150° F. such that the phenol entrained in said gases is rendered sufficiently soluble in the water to extract it from the hydrocarbon gases, removing the resultant aqueous solution of phenol from the upper section of said absorption zone, cooling said aqueous solution to a temperature between 50° F. and 100° F. so that upon introduction thereof into a settling zone two immiscible phases are formed, one comprising concentrated phenol and the other comprising water containing a minor quantity of phenol, separating the concentrated phenol phase from the aqueous phase, returning the concentrated phenol phase to the alkali metal phenolate solution, and returning the aqueous phase to the washing operation aforesaid.

3. A process for removing $H_2S$ from hydrocarbon gases, which comprises scrubbing the gases with an alkali metal phenolate solution in an absorption zone, removing the phenolate solution from the lower section of said zone, regenerating said solution to drive off the $H_2S$, recycling the regenerated solution to the absorption zone, further washing the hydrocarbon gases with water in the upper section of said absorption zone at a temperature between 120° F. and 150° F. and under a pressure between 100 and 300 pounds per square inch such that the phenol entrained in said gases is rendered sufficiently soluble in the water to extract it from the hydrocarbon gases, removing the resultant aqueous solution of phenol from the upper section of said absorption zone, cooling said aqueous solution to a temperature between 50° F. and 100° F. so that upon introduction thereof into a settling zone two immiscible phases are formed, one comprising concentrated phenol and the other comprising water containing a minor quantity of phenol, separating the concentrated phenol phase from the aqueous phase, returning the concentrated phenol phase to the alkali metal phenolate solution, and returning the aqueous phase to the washing operation aforesaid.

WILLIAM E. CHALFANT.
HENRY F. McCONOMY.